(12) United States Patent  (10) Patent No.: US 8,109,264 B1
Murray  (45) Date of Patent: Feb. 7, 2012

(54) HOT WATER SOLAR HEATING SYSTEM AND METHOD

(76) Inventor: William M. Murray, Enola, PA (US)

( * ) Notice: Subject to any disclaimer, the term of this patent is extended or adjusted under 35 U.S.C. 154(b) by 0 days.

(21) Appl. No.: 12/779,447

(22) Filed: May 13, 2010

(51) Int. Cl.
*F24J 3/02* (2006.01)
*F25B 13/00* (2006.01)

(52) U.S. Cl. ........ 126/640; 126/430; 126/270; 126/271; 126/400; 126/434; 137/59; 137/60

(58) Field of Classification Search .................. 126/640, 126/270, 271; 137/59, 79, 80
See application file for complete search history.

(56) References Cited

U.S. PATENT DOCUMENTS

| | | | |
|---|---|---|---|
| 2,202,756 A | | 5/1940 | Cline |
| 2,716,179 A | * | 8/1955 | Cornella ...................... 392/468 |
| 3,039,453 A | | 6/1962 | Andrassy |
| 3,823,572 A | * | 7/1974 | Cochran, Jr. .................. 62/160 |
| 3,900,047 A | | 8/1975 | Heppell |
| 4,074,406 A | | 2/1978 | Boyd et al. |
| 4,083,093 A | * | 4/1978 | Chertok ................... 29/890.033 |
| 4,129,177 A | * | 12/1978 | Adcock ........................ 165/48.2 |
| 4,142,514 A | * | 3/1979 | Newton ........................ 126/677 |
| 4,171,621 A | * | 10/1979 | Trelease .......................... 62/160 |
| 4,191,166 A | * | 3/1980 | Saarem et al. ................. 126/585 |
| 4,202,320 A | | 5/1980 | Bowen |
| 4,286,580 A | * | 9/1981 | Sitnam ......................... 126/657 |
| 4,308,856 A | | 1/1982 | Durand et al. |
| 4,309,987 A | | 1/1982 | Higgins |
| 4,328,679 A | * | 5/1982 | Usui et al. ....................... 62/141 |
| 4,336,792 A | * | 6/1982 | Seiler .............................. 126/588 |
| 4,474,172 A | | 10/1984 | Burke |
| 4,479,487 A | * | 10/1984 | Migdal ........................ 126/588 |
| 5,014,770 A | * | 5/1991 | Palmer ........................ 165/48.2 |
| 5,142,882 A | | 9/1992 | Vandenberg |
| 5,143,053 A | * | 9/1992 | Baer ............................. 126/662 |
| 5,638,847 A | * | 6/1997 | Hoch et al. ....................... 137/80 |

FOREIGN PATENT DOCUMENTS

| | | | |
|---|---|---|---|
| DE | 195 05 857 | | 8/1996 |
| FR | 2444241 A | * | 8/1980 |
| JP | 9079664 | | 3/1997 |

OTHER PUBLICATIONS

Machine translation in English for FR 2444241A of Salva et al.*

* cited by examiner

*Primary Examiner* — Steven B McAllister
*Assistant Examiner* — Nikhil Mashruwala
(74) *Attorney, Agent, or Firm* — Hooker & Habib, P.C.

(57) ABSTRACT

A hot water solar heating system includes a solar collector assembly located outside a building, a hot water tank located inside the building and supply and return pipes connecting the tank to the solar collector assembly. Portions of the supply and return pipes are located outside the building and are subject to below freezing temperatures and ice blockages. The system includes resistance heating wires which melt ice blockages in the exterior portions of the supply and return pipes.

20 Claims, 6 Drawing Sheets

HOT WATER SOLAR HEATING SYSTEM AND METHOD

FIELD OF THE INVENTION

The invention relates to a system for solar heating hot water and to a method for operating a solar heating system to melt ice blockages.

BACKGROUND OF THE INVENTION

Solar heating systems for heating water and flowing the heated water to a hot water tank are well known. Water from a tank inside a building is flowed through a supply pipe to a solar collector assembly located outside the building, is heated by solar energy and is flowed through a return pipe back into the building and to the tank. In its simplest form, the solar collector assembly includes a solar collector having an absorber which heats a pipe carrying water from the tank. A circulation pump flows water from the tank to the collector assembly and back to the tank.

A solar heating system of this type can operate even when the outdoor temperature is below freezing. This is because collected solar energy heats the pipe in the collector assembly to a temperature sufficiently high to heat water in the tank. However, the supply and return pipes may be exposed to outdoor temperature below freezing so that water in these pipes freezes, blocks flow and prevents operation of the heating system.

Conventional solar heating systems for use in locations where freezing temperatures occur avoid the problem of frozen supply and return pipes by draining the water from the pipes when solar radiation is absent or insufficient to provide heating. This increases system complexity and prevents use of the system during cold months.

Another solution to the problem of frozen supply and return pipes in solar heating systems is to eliminate water from the pipes and substitute a non-freezing liquid, such as an ethylene glycol-water mixture. The mixture is circulated through the solar collector, is heated by solar energy and is then flowed to a heat exchanger external of the water tank. Heat from the ethylene glycol mixture is flowed to water in the exchanger, which is heated and then flowed to the tank. This solution is less efficient than a system in which tank water is heated directly in the solar collector assembly and is considerably more complicated and expensive than a system using water as a heat transfer medium.

Accordingly, there is a need for an improved solar heating system using water as the heat transfer medium which works when the outdoor temperature falls below freezing. There is also need for a system which automatically clears an ice blockage in a supply or return pipe and resumes operation after an ice blockage has been cleared. The system should have a solar collector using a water heating pipe which is not injured when water in the pipe freezes and expands.

SUMMARY OF THE INVENTION

The hot water solar heating system according to the invention has a solar collector assembly mounted on the outside of a building and a hot water tank inside the building. Water from the tank is flowed through a supply pipe to a water heating pipe in the solar collector assembly and through a return pipe back to the tank. Portions of the supply and return pipes are located outside the building. In the event of an ice blockage in a supply or return pipe when there is no ice blockage in the water heating pipe, a resistance electric wire in heat-flow communication with the ice blockage is actuated to melt the ice blockage and reestablish flow of water through the pipes and operation of the system.

The water heating pipe has a non-circular cross section and is formed from an elastically deformable metal, which may be austenitic stainless steel. Expansion of water as it freezes into ice to form a blockage in the water heating pipe elastically deforms the pipe outwardly but does not deform the pipe to a circular cross section and does not injure or crack the pipe. When solar energy melts the blockage, the pipe elastically returns to its initial shape.

DESCRIPTION OF THE PREFERRED EMBODIMENT

Figure 1:
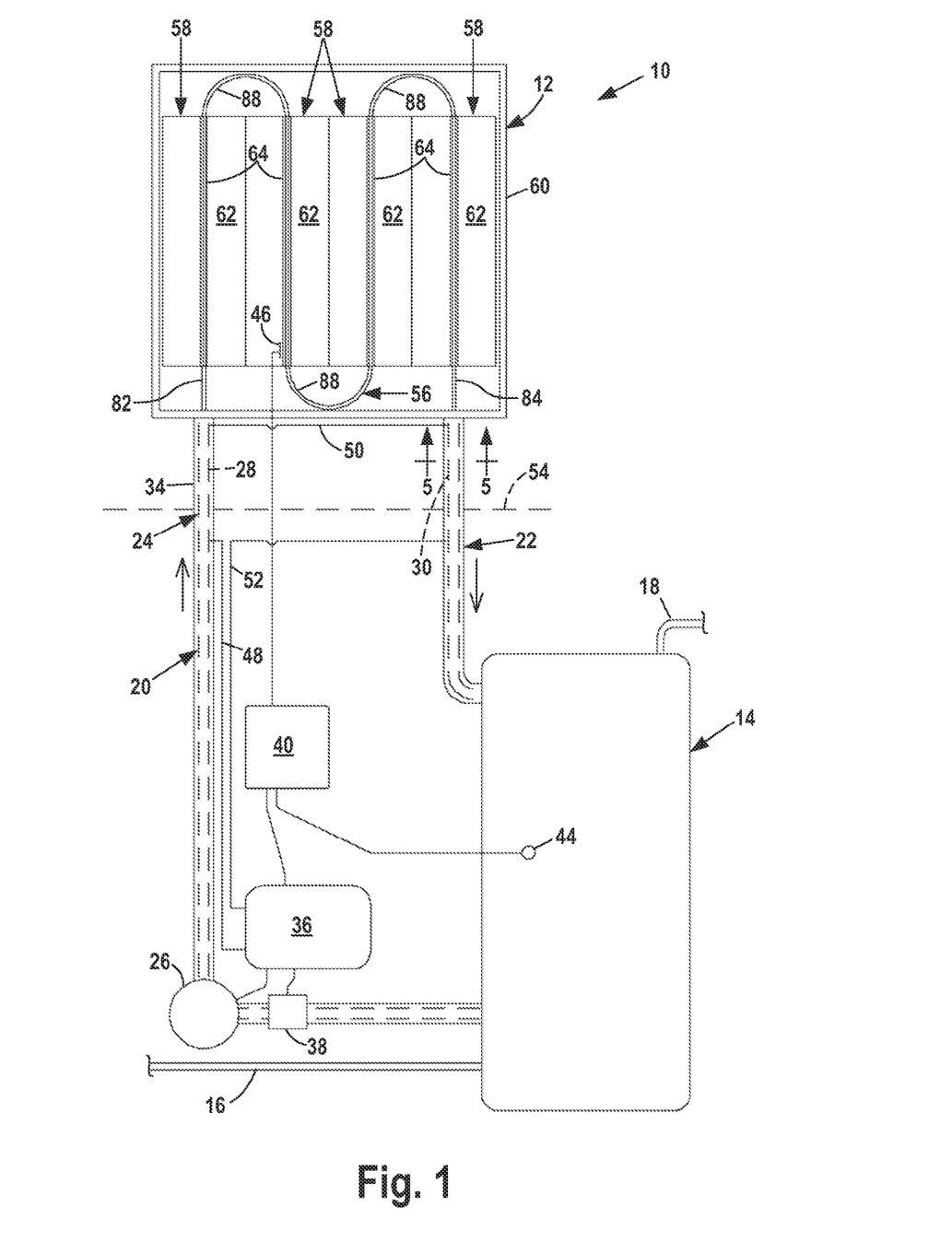
FIG. 1 is a representational view of a first embodiment solar heating system according to the invention.

Solar heating system 10 is illustrated in FIG. 1. System 10 includes a solar collector assembly 12, and a heated water storage tank 14. The system provides heated water for use in a building, typically a residential dwelling. The solar collector assembly 12 is mounted on the outside of the building and is positioned to receive solar energy. The tank 14 is located inside the building.

Cold water supply pipe 16 flows water to the bottom of tank 14 from a water source. Heated water outflow pipe 18 flows heated water from the top of the tank for use in the building. Collector supply pipe 20 extends from the bottom of tank 14 to collector assembly 12. Collector return pipe extends from the collector assembly to the top of the tank. Pipes 20 and 22 are formed preferably from PEX tubing. Circulator pump 26 located in pipe 20 flows water from the bottom of the tank through pipe 20, assembly 12 and pipe 22 back to the top of the tank. Water flowed through assembly 12 is heated by solar energy and heats the water in the tank. The portions 28 and 30 of pipes 20 and 22 outside of building wall 54 are connected to water heating pipe 56 running through collector assembly 12. Pipes 20, 56 and 22 form water conduit 24 extending from the tank 14, to assembly 12 and back to the tank.

Figure 5:
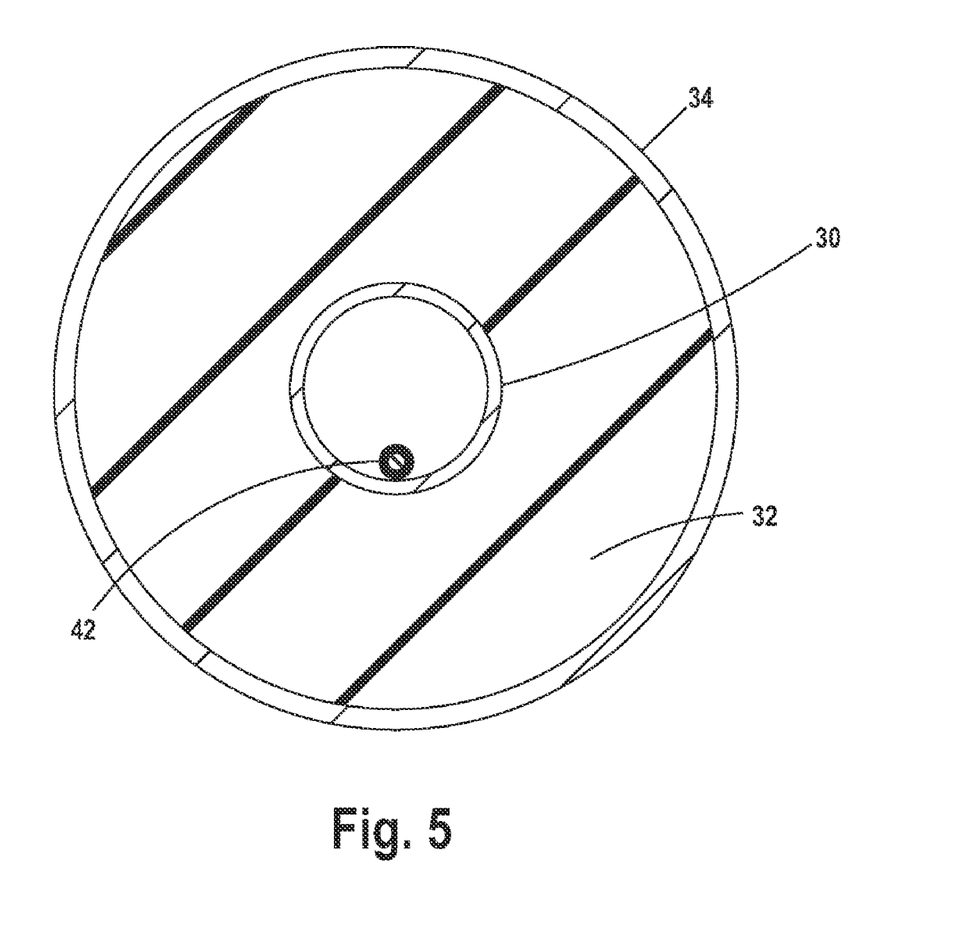
FIG. 5 is a sectional view along line 5-5 of FIG. 1.

Supply and return pipes 20 and 22 extend from tank 14 inside the building, through the exterior building wall 54 to collector assembly 12 mounted on the exterior of the building, typically on the roof of the building. The outdoor portions 28 and 30 of pipes 20 and 22 run from wall 54 to assembly 12. Portions 28 and 30 may extend from ground level up along a side of the building to assembly 12 mounted on the roof of the building. Pipes 20 and 22 are surrounded by tubes of thermal insulation 32 and outer protective sheaths 34. See FIG. 5. The insulation 32 minimizes thermal losses in pipes 20 and 22 and prevents condensation. Pipes 20 and 22 are typically formed from PEX tubing which is not injured by freezing of water within it.

Electric control circuit 36 operates system 10. Circuit 36 is connected to flow sensor 38 located in collector supply pipe 20, and to differential thermostat 40. Circuit 36 activates and deactivates an electric resistance heating wire 42 located in each outdoor portion 28 and 30 of pipes 20 and 22.

Thermostat 40 includes temperature sensor 44 in tank 14 and temperature sensor 46 on water heating pipe 56 in collector assembly 12. Sensor 44 senses the temperature of the water in the tank. Sensor 46 senses the temperature of the water in pipe 56 in the collector assembly. The differential thermostat 40 senses when the temperature at the heating pipe 56 exceeds the temperature of water in tank 14 by a predetermined amount using inputs from sensors 44 and 46, and when this condition exists it sends a signal to control circuit 36.

Power wire 48 extends from control circuit 36 through the wall of pipe 20 inside of building wall 54 and is connected to a resistance heating wire 42 in pipe portion 28 extending from wall 54 to housing 60.

Power wire 50 extends from the end of the resistance heating wire 42 in pipe 20 adjacent the housing 60, through the wall of the pipe, along the housing, through the wall of pipe 22 adjacent housing 60 and joins the end of a second resistance heating wire 42 in the outer end 30 of pipe 22. Wire 42 extends along the interior of pipe 22 through wall 54 and inside the building. Power wire 52 extends from the end of wire 42 through the wall of pipe 22 and to control circuit 36. When actuated, the two resistance heating wires 42 melt ice blockages in the exterior portions 28 and 30 of pipes 20 and 22 extending from wall 54 to collector assembly 12.

Figure 2:
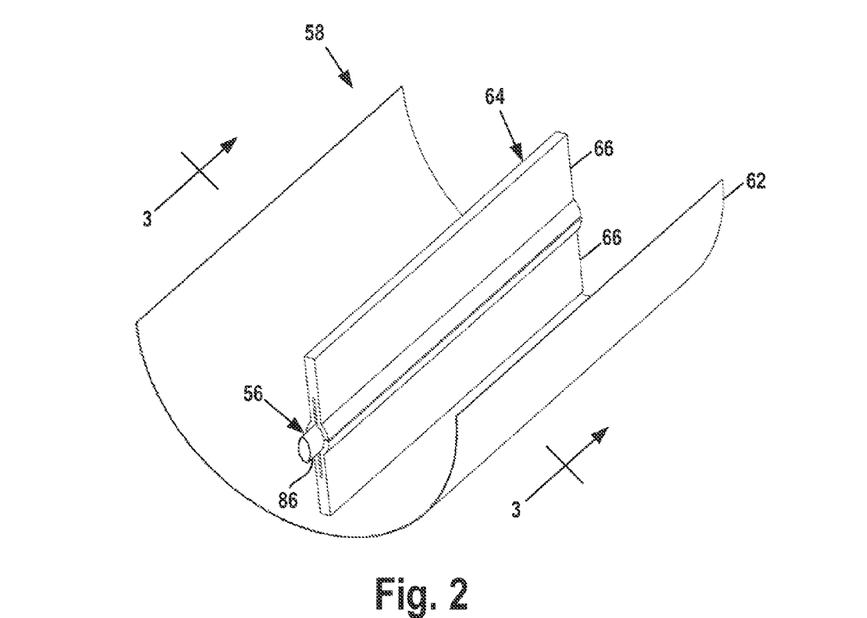
FIG. 2 is a perspective view of a solar collector.

Solar collector assembly 12 includes four solar collectors 58 mounted side-by-side in housing 60. A sheet transparent to solar energy overlies the top of the housing to provide thermal insulation and to prevent water and debris from entering the housing.

Figure 3:
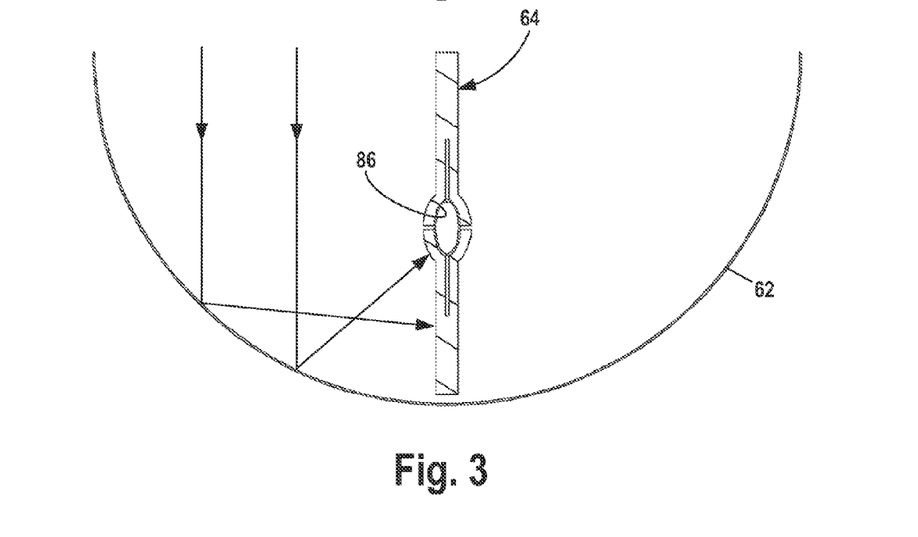
FIG. 3 is a sectional view taken along line 3-3 of FIG. 2.

Each solar collector 58 includes an elongate, semi-cylindrical mirror 62 and a vertical solar absorber 64 in the center of the mirror. Water heating pipe 56 extends along the center of the absorber 64 between a pair of like energy absorber plates 66.

Figure 4:
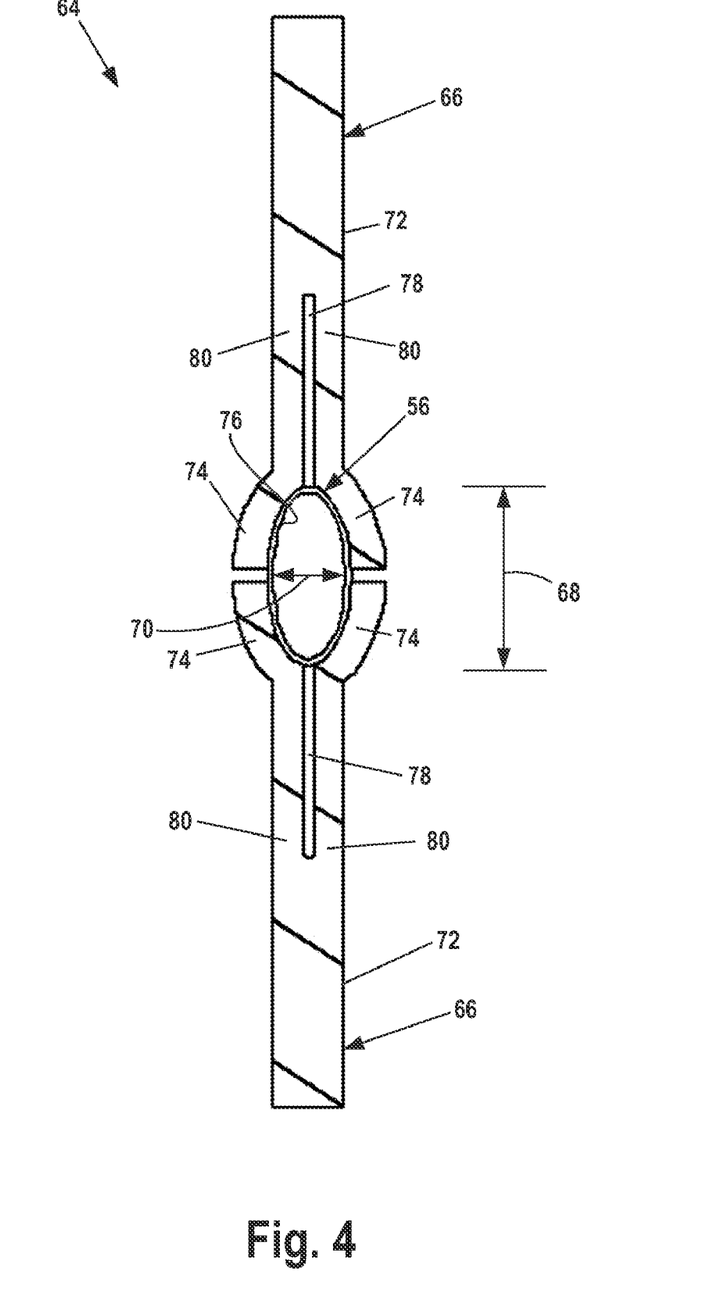
FIG. 4 is an enlarged sectional view of an absorber and water heating pipe shown in FIG. 3.

The pipe 56 is elliptical in cross section and has a short axis 70 and a long axis 68. The pipe is preferably formed from thin walled, elastic metal which may be austenitic or Series 300 stainless steel. The pipe sidewall may be about 0.020 inches thick to permit elastic outward flexing of the sidewall of the pipe when water in the pipe freezes and increases in volume. The pipe short axis 70 is sufficiently less than its long axis 68 so that when water in the pipe freezes and expands about 9%, the increased volume of the ice in the pipe elastically expands the pipe but does not expand the pipe to a maximum, circular cross section. Expansion of the pipe does not permanently deform or crack the pipe. When ice in the pipe melts, the pipe elastically returns to its original shape.

Elliptical pipe 56 should have an axis ratio (length of long axis 68 divided by length of short axis 70) of 1.44 or greater to prevent freeze expansion of the pipe to a circular cross section. In practice, the pipe may have an axis ratio of at least 1.50 to limit flexing of the pipe when water freezes and to reduce the possibility of fatigue cracking.

Pipe 56 need not have an elliptical cross section. The pipe may have two opposed long sides joined by short ends, or other cross sectional shapes which permit outward elastic flexing of the pipe wall when water in the pipe freezes. Typical domestic water pressure of less than 100 psi does not significantly deform pipe 56.

Energy absorbing plates 66 are preferably formed from extrusions of high thermal conductivity metal, such as aluminum. Each plate includes a flat, two-sided absorber panel 72 extending away from pipe 56 in a direction along pipe long axis 68. A pair of opposed pipe contact arms 74 at the inner edge of panel 72 extend to either side of pipe 56. The arms 74 are connected to the panels 72 by beams 80. The concave inner surfaces 76 of arms 74 are semi-elliptical in shape and are in surface-to-surface heat transfer contact with the outer surface of pipe 56. See FIG. 4. A slot or slit 78 extends from arms 74 into panel 72 to either side of beams 80 to permit elastic flexing of the beams and outward movement of arms 74 with expansion of pipe 56 when water in the pipe freezes.

The spacing between arms 74 before mounting of plates 66 on the pipe 56 is slightly less than shown in FIG. 4 so that beams 80 are flexed outwardly slightly when the plates are mounted on the pipe and tight, surface-to-surface heat transfer connections are established between arms 74 and pipe 56. The connections promote efficient flow of solar heat from the plates to the pipe to heat water in the pipe.

If desired, a thin layer of flexible, thermally conductive material can be provided in the interface between surfaces 76 of arms 74 and the outer surface of pipe 56. The flexible, thermally conductive material may be silicon grease with thermally conductive particles. The material increases heat flow from the plates 66 to the pipe.

Water heating pipe 56 includes an inlet end 82 joined to pipe 20 and an outlet end 84 joined to pipe 22. The pipe includes four straight heat-absorbing lengths 86 each extending along one of the four side-by-side semi-cylindrical mirrors 62 in assembly 12. The pipe also includes three semi-circular, 180-degree bends 88 between adjacent pipe lengths 86. Mirrors 62 may have a diameter of eight inches so that the radius of curvature of bends 88 is four inches.

Pipe 56 may be formed from a continuous length of elliptical stainless steel piping. Tooling is used to bend segments of the pipe about axes parallel to the pipe long axis 68 to form bends 88. Forming bends 88 by bending elliptical pipe around its long axis is easier than forming bends in a cylindrical pipe or bending elliptical pipe around an axis parallel to the short pipe axis.

Portions 28 and 30 of pipes 20 and 22 extend outside of the building and are exposed to temperatures which can form ice blockages in the PEX tubing. An ice blockage prevents flow of water through system 10 but does not injure the PEX tubing. Insulated resistance heating wires 42 extend through the interiors of portions 28 and 30 of pipes 20 and 22 and are in direct contact with any ice blockage in the outdoor portions of the pipes. Heating of the resistance wires efficiently melts the ice blockage.

If desired, a resistance heating wire, or a number of resistance heating wires, may be mounted outside pipe portions 28 and 30. Flowing electricity through a wire or wires mounted on the outside of the portions heats each pipe and melts an ice blockage in the pipe.

The semi-cylindrical mirrors 62 have highly reflective inner surfaces. Sunlight received by the mirrors is reflected inwardly against the vertical absorber 64. The sides of absorber plates 66 have heat-absorbing coatings to absorb heat from light reflected against the plates by the mirrors. Sunlight received by the mirrors is reflected against the absorber plates, independent of the angle at which the light strikes the mirrors.

Mirrors 62 need not be semi-cylindrical. The mirrors may have different shapes in order to reflect captured light onto plates 66.

The operation of solar heating system 10 will now be described.

Sunlight is reflected by mirrors 62 against both sides of absorbers 64 to heat plates 66. Heat from the plates flows to pipe 56 to heat water in the pipe. When the temperature in pipe 56, as determined by sensor 46, exceeds the temperature of the water in tank 14, as determined by sensor 44, by a predetermined difference, which may be 30 degrees F., the differential thermostat 40 sends a signal to control circuit 36 and the circuit actuates circulator pump 26. Pump 26 flows water from the bottom of tank 14 through the collector assembly 12 for solar heating and flows the heated water from the assembly into the top of the tank to heat the tank water. When the temperature of the water in the collector assembly no longer exceeds the temperature of the water in the tank by the predetermined difference, the control circuit 36 turns off circulator pump 26.

If the temperature outside the building wall 54 falls below freezing, water in the outside portions 28 and 30 of pipes 20 and 22 may freeze, despite the fact that water in pipe 56 in collector assembly 12 is heated above freezing and may be warmer than water in tank 14. In this event, an ice blockage prevents solar heating of water in tank 14.

When water freezes to block pipe portion 28 or 30, pump 26 will run but water will not flow through pipe 20, pipe 56 and pipe 22. The absence of flow while pump 26 is running is detected by direct flow sensor 38 which sends a signal to circuit 36. Circuit 36 then flows electricity through power wires 48 and 52 to heat the resistance wires 42 in pipe portions 28 and 30. One of the wires 42 extends past the ice blockage. Heat from the wire 42 melts the ice blockage to reestablish flow of water through the pipe 56 by pump 26.

The resistance heating wires 42 are activated until sensor 38 detects reestablished flow of water, which may be slight at first. Once flow has been reestablished, a signal from flow sensor 38 actuates circuit 36 to deactivate the wires 42. Water is flowed past the remaining ice to rapidly melt the ice and reestablish normal operation of system 10, despite an outdoor temperature below freezing.

Flow sensor 38 detects decreased flow or no flow due to an ice blockage. The sensor may include a vane or a rotary turbine wheel located in supply pipe 20 and a detector responsive to movement of the vane or wheel. Other types of flow sensors may be used if desired including differential pressure flow sensors, ultrasonic flow sensors, calorimetric flow sensors, and the like.

Figure 6:
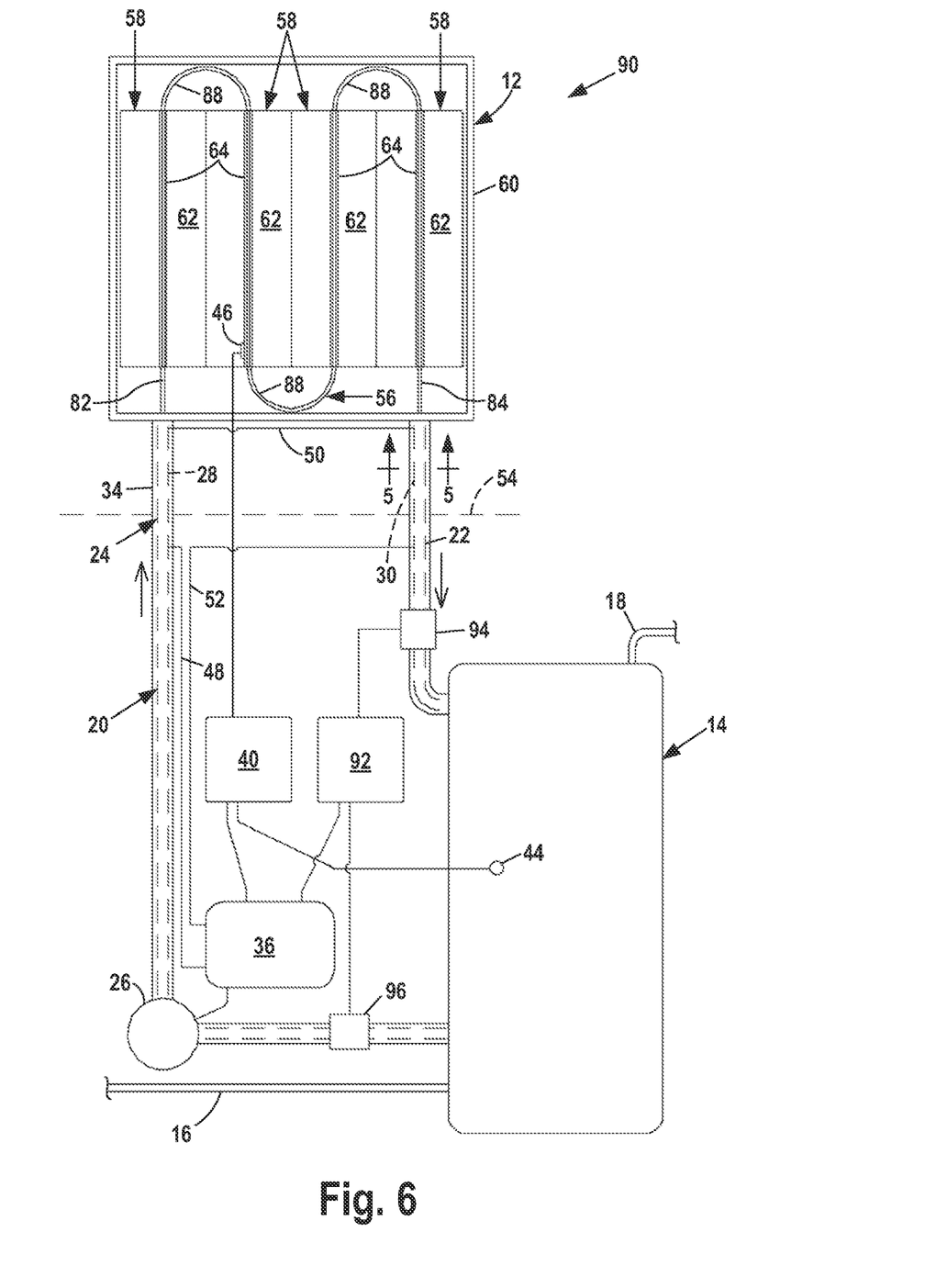
FIG. 6 is a representational view of a second embodiment solar heating system.

FIG. 6 illustrates a second embodiment solar heating system 90 which is like solar heating system 10. Reference numbers shown in FIG. 5 which are identical to reference numbers shown in FIG. 1 describe components of system 90 identical to the components of system 10. System 90 includes a solar collector assembly 12, water storage tank 14, water supply and return pipes 20 and 22, including insulated portions 28 and 30, pump 26 and differential thermostat 40, as previously described. Control circuit 36 is connected to the differential thermostat 40 and to pump 26.

System 90 includes a second differential thermostat 92 connected to temperature sensor 94 located in the return pipe 22 inside of exterior wall 54 and to temperature sensor located in supply pipe 20 inside of exterior wall 54. System 90 does not use a flow sensor 38 and does not sense flow using moving parts.

During normal operation of solar heating system 90, pump 26 is actuated to circulate water through the solar collector 12 and flow the heated water back to tank 14, as previously described. Temperature sensor 94 detects decreased temperature in pipe 22 due to decreased flow and is an indirect flow sensor. If an ice blockage exists in portion 28 or 30 of pipe 20 or 22 the blockage will prevent flow of heated water from collector assembly 12 to tank 14. The temperature of the water in pipe 22 will not rise. When this condition exists the temperature difference between the water in pipe 22 will not greatly exceed that in pipe 20, as determined by sensors 94 and 96. When this difference is below a predetermined amount, which may be 20° F., differential thermostat 92 sends a signal to control circuit 36 to actuate the resistance heating wires 42 in the exterior portions 28 and 30 of pipes 20 and 22 to melt the ice blockage, as previously described.

Melting of the blockage and flow of heated water through pipe 22 which will raise the temperature of the water in the pipe. When the temperature of the water in pipe 22 exceeds the temperature of the water in pipe 20, as again determined by temperature sensors 94 and 96, by the predetermined amount, the differential thermostat 92 sends a signal to control circuit 36 to deactivate the resistance heating wires in pipe portions 28 and 30. Flow of water through the exterior portions 28 and 30 of pipes 20 and 22 melts any remaining ice in the blockage to reestablish normal operation of system 90.

Figure 7:
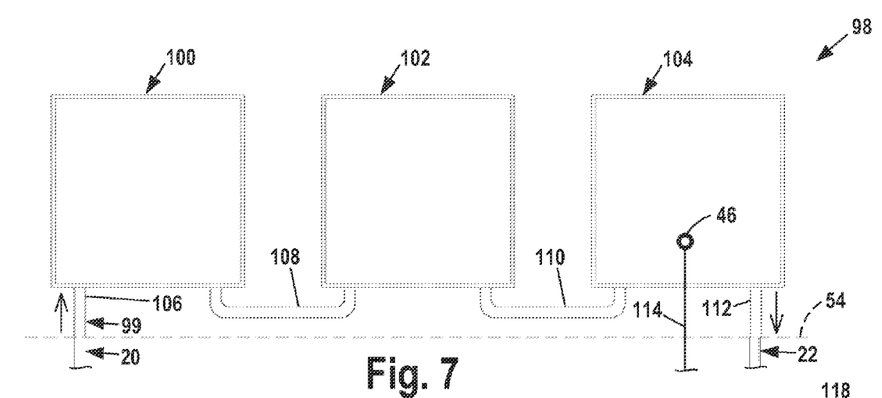
FIG. 7 is a representational view of a third embodiment solar heating system.

FIG. 7 illustrates third embodiment solar heating system 98 having three series connected solar heating assemblies 100, 102 and 104 which replace the single assembly 12 used in the systems of FIGS. 1 and 6. The assemblies are each identical to solar collector assembly 12. The three collector assemblies are connected to water supply pipe 20 and water return pipe 22 of a solar heating system 10 or 98 located inside of building exterior wall 54. These alternative interior components are not illustrated in FIG. 7.

The outer insulated end 106 of pipe 20 extends from wall 54 to collector assembly 100 and is connected to the inlet end of water heating pipe 56 in assembly 100. Pipe end 106 is surrounded by insulation and a sheath, as previously described. The outlet end of water heating pipe 56 in assembly 100 is connected to an insulated pipe 108 extending from assembly 100 to assembly 102. Pipe 108 is connected to the inlet end of pipe 56 in assembly 102. The outlet end of pipe 56 in assembly 102 is likewise connected by insulated pipe 110 to the inlet end of the pipe 56 in assembly 104. The outlet end of pipe 56 in assembly 104 is connected to the insulated outer end 112 of pipe 22 which extends to wall 54. The control wiring 114 for temperature sensor 46 in assembly 104 extends through wall 54 to the differential thermostat 40 for system 98. Resistance heating wires (not illustrated) extend through outdoor pipes portions 106, 108, 110 and 112 and are connected to power wires 48 and 50. The resistance heating wires are actuated to melt ice blockages as previously described. Pipes 20, 56, 108, 110 and 22 form a single passage water conduit 99 extending from tank 14, through the assemblies 100, 102 and 104 and back to the tank.

The system 98 operates essentially like the systems 10 and 90. Pump 26 circulates water through the three solar collector assemblies 100, 102 and 104 and water is solar heated. The temperature sensor 46 determines the temperature of the water in assembly 104, which typically is higher than the temperatures of the water in assemblies 100 and 102. This temperature is used to determine whether the water returned through pipe 22 is sufficiently hot to heat the water in tank 14.

Figure 8:
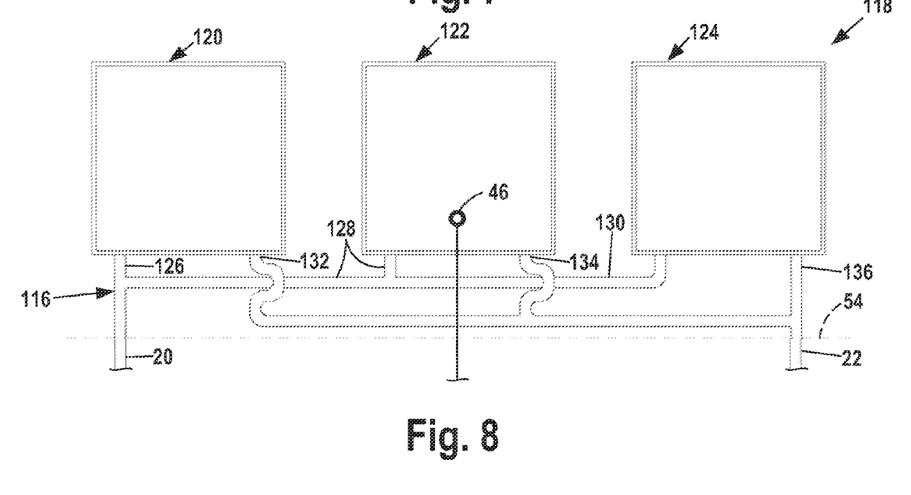
FIG. 8 is a representational view of a fourth embodiment solar heating system.

FIG. 8 illustrates a fourth embodiment solar heating system 118 which includes three parallel connected solar collector assemblies 120, 122 and 124. The assemblies are each identical to solar collector assembly 12. The three collector assemblies are connected to water supply pipe 20 and water return pipe 22 of system 10 or system 98 located inside building exterior wall 54. These components are not illustrated in FIG. 8.

Water supply pipe 20 extends outwardly of wall 54 and includes insulated outdoor supply branches 126, 128 and 130. The branches are connected respectively to the inlet ends of the water heating pipes 56 in the three assemblies. The outlet ends of the water heating pipes 56 in the assemblies are connected to insulated return branches 132, 134 and 136 of return pipe 22. All of the portions of the supply and return pipes located outwardly of wall 54 and connected to the three assemblies are surrounded by insulation and protective sheeting, as previously described. A single temperature sensor 46 is connected to a water heating pipe 56 in collector assembly 122. The sensor may be attached to the water heating pipe in any of the collector assemblies. Insulated resistance heating wires (not illustrated) are extend through the supply and return branches of pipes 20 and 22. When an ice blockage is sensed, the wires are actuated to melt the blockage, as previously described. Pipes 20, 56 and 22 form a plural passage water conduit 116 extending from tank 14, through assemblies 120, 122 and 124 and back to the tank.

During operation of system 118, pump 26 flows water from tank 14 through the three collector assemblies and flows the heated water directly back to the tank. The system 118 operates like system 10 or 98, as previously described.

Solar heating systems 98 and 118 use plural solar collector assemblies in order to increase the capacity and performance of the system. The use of a number of small individual solar collector assemblies facilitates manufacture, transportation and the mounting of the assemblies on the roof of a dwelling. Frequently smaller assemblies can be mounted advantageously where it is impossible to mount a large assembly having the same heating capacity.

What I claim is my invention:

1. A solar water heating system comprising a first solar collector outside a building, the collector having a solar energy absorbing member; a heated water storage tank inside the building; a water conduit extending from the tank, outside the building, through the collector, inside the building and back to the tank; water in the conduit; said conduit including a first conduit portion in heat-flow engagement with said absorbing member and a second conduit portion, said first and second portions outside the building and exposed to freezing temperatures; a circulation pump in said water conduit, wherein the pump normally flows water from the tank through the conduit, past the energy absorber for heating by solar energy and back to the tank; a flow detector for said water conduit; a resistance-heating wire located in said second conduit portion in heat-flow communication with an ice blockage in said second conduit portion; and a control member for flowing electricity through the resistance wire in response to a reduced flow signal from the flow detector; wherein when water in the second portion of the water conduit freezes to form an ice blockage which reduces the flow of water through the water conduit the resistance wire is actuated to melt the ice blockage and reestablish flow through the water conduit.

2. The system as in claim 1 wherein the first conduit portion comprises a non-circular metal pipe.

3. The system as in claim 2 wherein the pipe is made from austenitic stainless steel.

4. The system as in claim 3 wherein the pipe has an axis ratio of greater than 1.33.

5. The system as in claim 4 wherein the pipe has a wall thickness of about 0.02 inches.

6. The system as in claim 4 wherein the pipe has a long axis of about 0.64 inches and a short axis of about 0.30 inches.

7. The system as in claim 4 wherein the pipe is elliptical.

8. The system as in claim 2 wherein the energy absorbing member comprises a panel having an energy absorbing surface and two flexible members engaging opposite sides of the pipe.

9. The system as in claim 8 wherein the energy absorbing member comprises an aluminum extrusion.

10. The system as in claim 1 wherein the flow detector comprises a flow sensor.

11. The system as in claim 1 wherein the flow detector comprises a temperature sensor.

12. The system as in claim 1 wherein said water conduit includes a single water passage.

13. The system as in claim 12 including a second solar collector, said water conduit extending through both said first and second solar collectors.

14. The system as in claim 1 wherein said water conduit comprises a plurality of water passages and including a second solar collector.

15. The system as in claim 1 wherein the flow detector senses no flow in the water conduit.

16. The sensor as in claim 1 wherein the resistance wire is in the second conduit portion.

17. A solar water heating system comprising a solar collector; a heated water storage tank; a continuous water conduit extending from the tank to the collector and from the collector back to the tank; a portion of the conduit exposed to freezing temperatures, said conduit portion extending through the solar collector; the collector including a solar energy absorbing member in heat-flow communication with the conduit portion; a circulator pump in the conduit; pump activating means for actuating the pump and flowing water from the tank to the solar collector and from the solar collector back to the tank when the temperature of the solar-heated water in the conduit exceeds the temperature of the water in the tank; means for preventing damage to the conduit portion when water in the conduit portion freezes and expands comprising a flow detector for sensing flow of water in the conduit; an electrical resistance-heating member located in said conduit portion in heat-flow communication with an ice blockage in the conduit portion for melting the blockage; and means for flowing electricity through the resistance-heating member when the flow detector senses reduced flow of water through the conduit due to the ice blockage.

18. The system as in claim 17 wherein said means for preventing damage comprises a non-circular metal pipe.

19. The system as in claim 18 wherein the metal pipe is made from austenitic stainless steel.

20. The system as in claim 18 wherein the solar energy absorbing member is made from aluminum and includes a flexible portion engaging a flexible wall of the pipe.

* * * * *